Patented Feb. 1, 1938

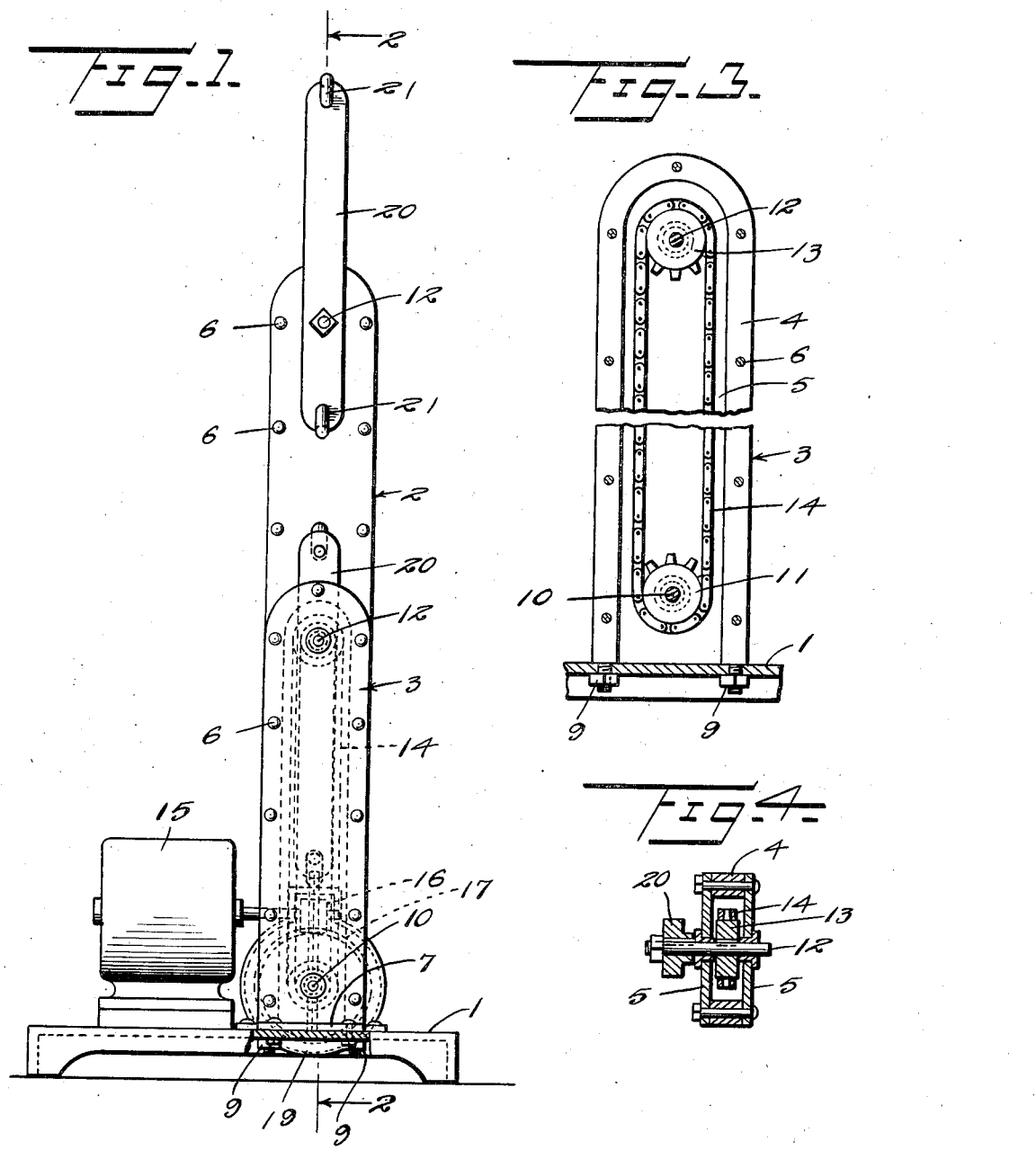

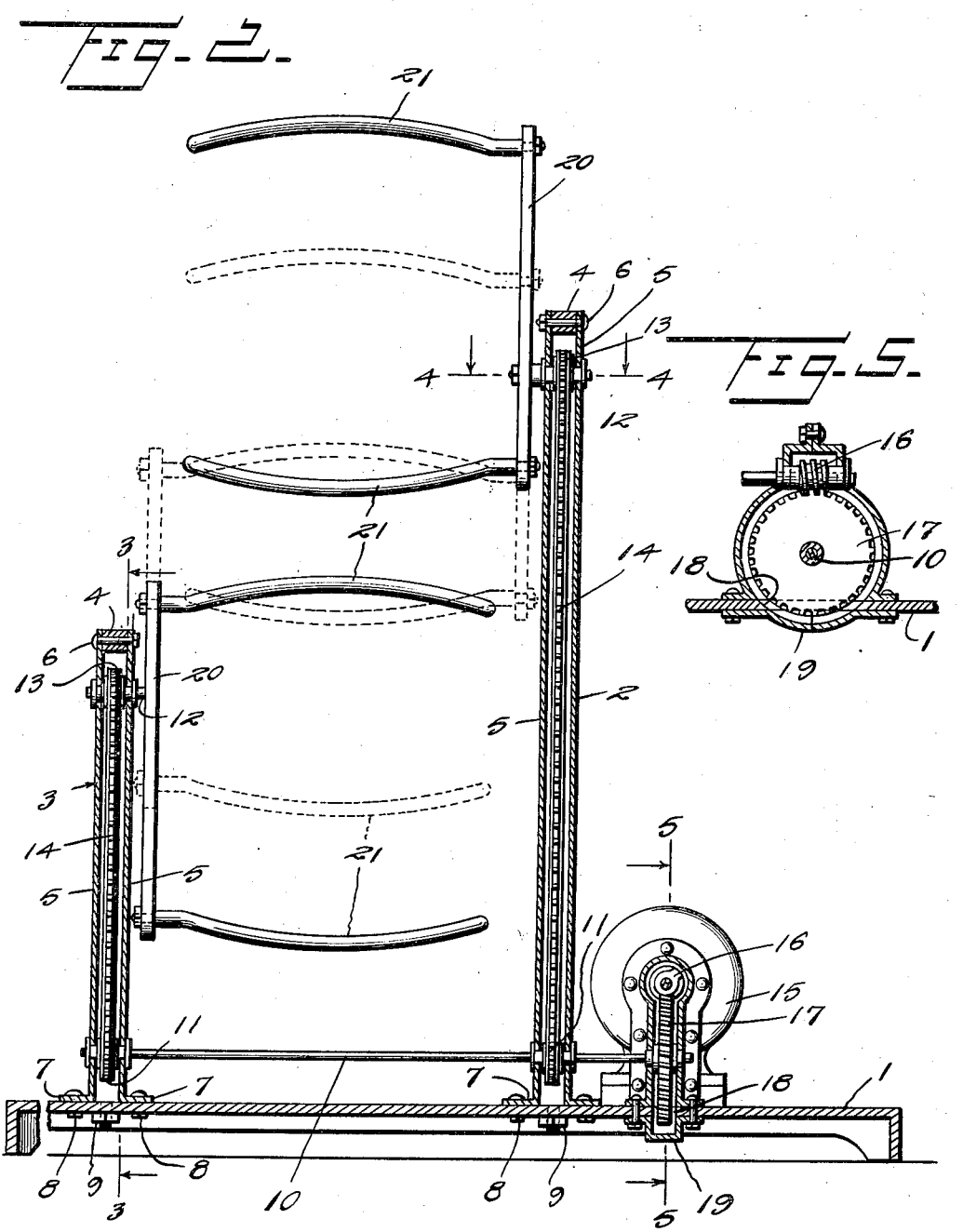

2,107,213

UNITED STATES PATENT OFFICE 2,107,213

CANDY PULLER

Alphonse Poirier, Dutton, Mont.

Application June 3, 1936, Serial No. 83,385

2 Claims. (Cl. 107—30)

This invention relates to candy pullers and has for the primary object the provision of an efficient and inexpensive device of this character which is power driven with the drive means substantially encased to prevent the candy from contacting therewith and which by slight alteration may be hand operated.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is an end elevation, partly in section, illustrating a candy puller constructed in accordance with my invention.

Figure 2 is a sectional view taken on the line 2—2 of Figure 1.

Figure 3 is a sectional view taken on the line 3—3 of Figure 2.

Figure 4 is a detail sectional view taken on the line 4—4 of Figure 2.

Figure 5 is a sectional view taken on the line 5—5 of Figure 2.

Referring in detail to the drawings, the numeral 1 indicates a base having detachably secured thereto vertically disposed and spaced uprights 2 and 3. The upright 3 is of a less height than the upright 2 and both uprights are of hollow formation and each includes a substantially U-shaped member 4 and side plates 5. The side plates 5 are detachably secured to the member 4 by fasteners 6 and their lower edges are bent angularly to form attaching feet 7 which rest on the base and are secured thereto by fasteners 8. The ends of the members 4 are reduced and screw threaded and extend through the base and have threaded thereon nuts 9. Thus it will be seen that the uprights are firmly secured to the base and may be readily detached therefrom and taken apart when necessary.

A shaft 10 is rotatably supported by the uprights and is located slightly above the base and secured to said shaft and located within the uprights are sprocket gears 11. Stub shafts 12 are journaled to the uprights adjacent the upper ends thereof and have secured thereto sprocket gears 13. Sprocket chains 14 are trained over the sprocket gears 11 and 13. An electric motor 15 is mounted on the base and is equipped with a worm 16 meshing with a worm gear 17 secured to the shaft 10. The worm gear 16 extends through a slot 18 in the base and underlying said slot and secured to the base is an offset pan 19 in which lubricant may be placed so that the worm gear 16 will be bathed in the lubricant during the rotation thereof.

Arms 20 are secured to the stub shafts 13 and each arm is secured to its respective stub shaft adjacent one end so that during the rotation of said arms they will pass each other in opposed relation. Curved fingers 21 are secured to the ends of the arms and the fingers of one arm extend in the direction of the fingers of the other arm so that during the rotation of the arms the fingers of one arm pass between the fingers of the other arm. Candy placed upon the fingers of the arms will be efficiently pulled during the rotation of the arms by the motor 15. The fingers of each arm are curved oppositely to each other.

Should it be desired to rotate the arms 20 manually, the motor 15, worm gear and worm are eliminated and a suitable handle is attached to one of the stub shafts.

Having described the invention, I claim:

1. A candy puller comprising a base, spaced vertically arranged uprights secured to said base and one of a shorter length than the other, stub shafts journaled to said uprights with their axes extending substantially in the same vertical plane, arms secured to said stub shafts, fingers secured to said arms to pass about each other during the rotation of the arms for pulling candy placed on said fingers, a driving shaft journalled in said uprights, means for drivingly connecting the stub shafts with said driving shaft, and means for rotating said driving shaft for imparting rotation to said stub shafts.

2. A candy puller comprising a base, spaced vertically arranged uprights secured to said base and one of a shorter length than the other, stub shafts journaled to said uprights with their axes extending substantially in the same vertical plane, arms secured to said stub shafts, fingers secured to said arms to pass about each other during the rotation of the arms for pulling candy placed on said fingers, said uprights being of hollow formation, a power shaft journaled to said uprights, sprocket chains and sprocket gears housed within said uprights providing driving connections between the stub shafts and the power shafts, and means for rotating the power shaft.

ALPHONSE POIRIER.